United States Patent [19]

Obayashi et al.

[11] Patent Number: 5,370,794
[45] Date of Patent: Dec. 6, 1994

[54] CARBON BEADS, PROCESS OF PRODUCING THE SAME AND CHROMATOGRAPHY COLUMN CONTAINING THE SAME

[75] Inventors: Takashi Obayashi; Makiko Ozawa; Taichiro Kawase, all of Iruma, Japan

[73] Assignee: Tonen Corporation, Tokyo, Japan

[21] Appl. No.: 123,748

[22] Filed: Sep. 7, 1993

Related U.S. Application Data

[63] Continuation of Ser. No. 701,819, May 17, 1991, abandoned.

[30] Foreign Application Priority Data

May 18, 1990 [JP] Japan .................. 2-128633

[51] Int. Cl.$^5$ ........................... B01D 15/08
[52] U.S. Cl. ................. 210/198.2; 210/502.1; 210/635; 210/656; 502/416; 502/418
[58] Field of Search .............. 210/635, 656, 198.2, 210/502.1; 502/416, 418, 433, 437; 423/445, 449; 264/29.5

[56] References Cited

U.S. PATENT DOCUMENTS

| | | | |
|---|---|---|---|
| 4,029,600 | 6/1977 | Schmitt | 502/418 |
| 4,225,463 | 9/1980 | Unger | 210/656 |
| 4,471,072 | 9/1984 | Leyerle | 502/418 |
| 4,528,281 | 7/1985 | Sutt | 502/418 |
| 4,540,678 | 9/1985 | Sutt | 502/418 |
| 4,552,863 | 11/1985 | Fujimori | 502/418 |
| 4,820,681 | 4/1989 | Chang | 502/418 |
| 4,839,331 | 6/1989 | Maroldo | 502/418 |
| 4,987,116 | 1/1991 | Karl | 502/418 |
| 5,059,578 | 10/1991 | Marumo | 502/418 |

FOREIGN PATENT DOCUMENTS

| | | | |
|---|---|---|---|
| 317217 | 5/1989 | European Pat. Off. | 210/198.2 |
| 2301551 | 2/1976 | France | 210/198.2 |
| 2415075 | 8/1979 | France | 210/198.2 |
| 56-44846 | 4/1981 | Japan | 210/198.2 |
| 58-41351 | 3/1983 | Japan | 210/198.2 |
| 2013642 | 8/1979 | United Kingdom | 210/198.2 |
| 2025385 | 1/1980 | United Kingdom | 210/198.2 |

OTHER PUBLICATIONS

Patent Office Translation PTO 93-0302 of Japan Kokai No. 58-41351, Nov. 1992, pp. 1-9.
Patent Office Translation PTO 93-0294 of Japan Kokai No. 56-44846, Nov.1992, pp. 1-10.
*Journal of Chromatography,* 119 (1976) 41-54, "Modified Carbon Black in HPLC" Colin et al.
*Journal of Chromatography,* 122 (1976) 223-242, "Reversed-Phase Liquid-Solid Chromatography on Modified Carbon Black" Colin et al.
*Journal of Chromatography,* 191 (1980) 61-69, "A PTFE-Based Carbon Adsorbent in High-Performance Liquid Chromatography" Smolkova et al.
*Analytical Chemistry,* vol. 53, No. 6, May 1981, pp. 812-816, "Chemical Modification of a Carbon Adsorbent for Liquid Chromatography" Zwier.
*Journal of Chromatography,* 269 (1983) 47-60, "Liquid Modifiers in Reversed-Phase Liquid Chromatography with Graphitized Carbon Black Adsorbents", Ciccioli.
*Journal of Chromatography,* 202 (1980) 3-14, "Novel Porous Carbon Packings in Reversed-Phase High-Performance Liquid Chromatography" Unger.
Abstract of 7th Carbon Material Chemistry Association p. 70 (1980).
Mol. Cryst. Liq. Crystl., 1983, vol. 94, pp. 97-108, "Mesophase Pitch and Meso-Carbon Microbeads" Honda.

*Primary Examiner*—Ernest G. Therkorn
*Attorney, Agent, or Firm*—Birch, Stewart, Kolasch & Birch

[57] ABSTRACT

Carbon beads useful as a packing of liquid chromatography column are disclosed. The carbon beads according to the present invention has a pore volume index (10-50)/(1-50) of not less than 50%, total pore volume of not less than 0.15 ml/g, total volume of pores with radii of not less than 50 nm of not more than 0.1 ml/g, and a carbon content of not less than 97% by weight.

9 Claims, 6 Drawing Sheets

CARBON BEADS, PROCESS OF PRODUCING THE SAME AND CHROMATOGRAPHY COLUMN CONTAINING THE SAME

This application is a continuation of application Ser. No. 07/701,819 filed on May 17, 1991, now abandoned.

BACKGROUND OF THE INVENTION

I. Field of the Invention

This invention relates to novel carbon beads, a process of producing the same and a liquid chromatography column containing the carbon beads as a packing.

II. Description of the Related Art

High performance liquid chromatography (HPLC) is a system with which a sample is separated by a chromatography column by passing a mobile phase solvent through the column with applied pressure and the eluted fractions are continuously monitored with a detector. In the last decade, HPLC has spread widely because it can be used in a wide variety of fields for analyzing wide variety of substances. Since HPLC has made it possible to analyze naturally occurring organic compounds and body components, which was conventionally difficult, HPLC has been practically employed in clinical tests, analysis of pharmaceuticals and toxicity tests, and has been rapidly developed.

Conventionally, silica-based packings and organic polymer-based packings (porous polymers) are used as packings of HPLC columns. However, silica-based packings have a drawback in that the chromatography is likely to be influenced by the silanol groups on the surfaces of the packings. As for the organic polymer-based packings, although they are insoluble in any solvent because they are crosslinked, they are swelled by their good solvents, that is, the solvents which dissolve the corresponding non-crosslinked polymers. Thus, in the HPLC in which an organic polymer gel is used as the stationary phase, exchange of solvents is usually difficult. Further, since the pressure resistance of the stationary phase is not sufficient, the flow rate of the eluent is limited.

Thus, it is desired to develop a packing for HPLC which can overcome the drawbacks of conventional HPLC packings. Carbon-based packings are expected as good candidates because they are resistant to swelling or shrinking and they are resistant to acid and base. It is important that a packing for HPLC should have the following properties:

(1) It is hard enough to withstand high pressure.
(2) It is stable during operation and storage.
(3) It suitably retains solutes.
(4) It has a uniform surface.
(5) It has an appropriate pore size.
(6) It is easily prepared.

Guiochon et al proposed a thermally decomposed modified carbon black prepared by vapor-depositing a thermally decomposed product of benzene on carbon black, and succeeded in synthesizing a carbon-based adsorbent (J. Liq. Chromatogr. 119, 41 (1976); J. Liq. Chromatogr., 12, 233 (1976)). However, this carbon-based adsorbent has drawbacks in that its capacity is small and the reproducibility of the chromatography using the adsorbent is low. Smolkova et al examined effectiveness of using a reduction product of polytetrafluoroethylene prepared by reducing it by lithium amalgam at room temperature (J. Liq. Chromatogr., 119, 61 (1980)). Zwier and Burke examined the effectiveness of surface chemical modification of fluoropolymer derivative by the reduction of Kel-F300 by lithium amalgam and by surface modification by a Grignard reagent (Anal. Chem., 53, 812 (1981)). Ciccioli et al examined the effectiveness of using a commercially available carbon black which is in the form of graphite (J. Chromatogr. 269, 47 (1983)). Unger et al examined the effectiveness of using cokes and active carbon (J. Chromatogr., 202, 3 (1980). Hagiwara et al examined the effectiveness of using mesophase carbon microbeads (Abstract of 7th Carbon Material Chemistry Association 70 (1980), Mol. Cryst. Liq. Cryst., 94, 97 (1983); Japanese Laid Open Patent Application (Kokai) Nos. 56-44846 and 58-41351). However, the chromatography packings of the pulverized type prepared by finely pulverizing these porous carbon material, the packings of the surface modified type prepared by coating gel surfaces with carbon or the packings of the crystal sphere type have drawbacks in that the size of the pores in the packings cannot be optionally controlled and the crystal state from amorphous to graphite cannot be chosen. Thus, it is practically impossible to employ these materials as packings of HPLC.

SUMMARY OF THE INVENTION

Accordingly, the object of the present invention is to provide novel particles which are excellent as a packing of HPLC as well as a production process thereof and a liquid chromatography column containing the particles.

The present inventors intensively studied to find that carbon beads with specific pore volume distribution, total pore volume and carbon content exhibit excellent performance when used as a packing for liquid chromatography and to succeed in the production of such beads, so that the present invention was completed.

That is, the present invention provides carbon beads having a pore volume index (10–50)/(1–50) of not less than 50%, total pore volume of not less than 0.15 ml/g, total volume of pores with radii greater than or equal to 50 nm of not more than 0.1 ml/g, and a carbon content of not less than 97% by weight.

The present invention also provides a process of producing said carbon beads of the present invention, which process comprises, in the order mentioned, the steps of subjecting a mixture containing a pitch with an average molecular weight of not less than 300, a monomer which constitutes an organic polymer, and a polymerization initiator to suspension polymerization; recovering generated beads; infusibilizing the recovered beads; and heating the infusibilized beads under vacuum or under inert gas atmosphere at a temperature of not lower than 1100° C.

The present invention still further provides a liquid chromatography column comprising said carbon beads of the present invention as a packing of said column.

By the present invention, novel carbon beads useful as a packing of liquid chromatography column was provided. The carbon beads of the present invention have an appropriate pore size distribution and a uniform surface, so that, when used as a packing for liquid chromatography, the separation efficiency is high. Further, they have a hardness high enough to withstand the high pressure applied when performing HPLC, so that they excel in stability during operation and storage. The process of the present invention made it possible to produce carbon beads with such excellent properties according to the present invention.

DETAILED DESCRIPTION OF THE PREFERRED EMBODIMENTS

Figure 1:
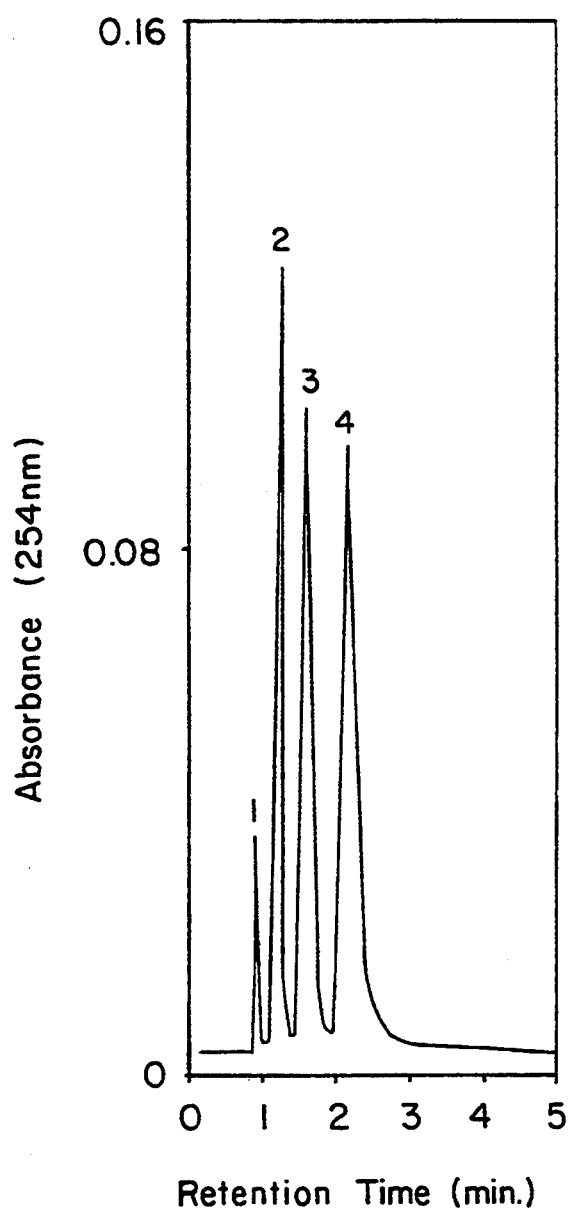
FIGS. 1-6 show liquid chromatogram obtained by using the packings of the examples of the present invention and packings of the comparative examples.

The carbon beads of the present invention have a pore volume index (10–50)/(1–50) of not less than 50%, preferably not less than 60%, more preferably not less than 80%. The pore volume index (10–50)/(1–50) herein means the ratio of the total volume of pores with radii of 10–50 nm to the total volume of pores with radii of 1–50 nm. If the pore volume index (10–50)/(1–50) is less than 50%, the separation efficiency of the chromatography employing the carbon beads as a packing is reduced.

The total pore volume of the carbon beads of the present invention is not less than 0.15 ml/g, preferably not less than 0.2 ml/g. If the total pore volume of the carbon beads is less than 0.15 ml/g, the solutes may not be appropriately retained by the packing, so that the separation efficiency of the chromatography employing the carbon beads as the packing is reduced.

The total volume of the pores with radii of greater than or equal to 50 nm is not more than 0.1 ml/g, preferably not more than 0.05 ml/g. If the total volume of the pores with radii of greater than or equal to 50 nm exceeds 0.1 ml/g, the strength of the beads is reduced and so the beads may be destroyed under high pressure which is applied during the operation of HPLC, so that the reproducibility of the chromatography may be reduced.

The pore volume mentioned above is measured by the nitrogen gas-adsorption method. In the examples hereinbelow described, the measurement of pore volume was carried out using a pore volume-measuring apparatus OMNISORP type 360 and 100 commercially available from Omicron Technology, and the calculation of the pore volume was carried out according to the BJH method proposed by Barret-Joyner Halenda et al.

The carbon beads of the present invention have a carbon content of not less than 97% by weight, preferably not less than 99% by weight. If the carbon content is less than 97%, the impurities such as S, O, H, N and metals serves as non-specific binding sites, so that the separation efficiency of the chromatography is reduced.

Although the particle size of the carbon beads of the present invention is not restricted, about 1–30 μm is preferred as a packing of the chromatography column.

The carbon beads of the present invention may be prepared as follows:

First, a mixture containing a pitch with an average molecular weight of not less than 300, a monomer of an organic polymer and a polymerization initiator is subjected to suspension polymerization, and the formed beads are recovered.

Although any organic polymer may be employed here as long as it can form a netty gel, preferred examples of the organic polymer include aromatic vinyl polymers such as polydivinylbenzene and polytrivinylbenzene, and polyethylene dimethacrylate.

The pitch employed as a starting material has an average molecular weight of not less than 300, preferably not less than 400. If the average molecular weight is less than 300, it is difficult to prepare the carbon beads with the pore volume distribution characteristics mentioned above. The average molecular weight of the pitch may be readily determined by the well-known vapor pressure equilibrium method using chloroform as a solvent. The pitch obtained during the processing of petroleum, the pitch obtained during dry distillation of coal, and synthetic pitches obtained from naphthalene, polyvinylchloride and the like may also be employed as the starting material.

The conditions of the suspension polymerization are essentially the same as the conventional synthesis of synthetic resins. The initial concentration of the organic monomer in the solvent may usually be 2–20% by weight, preferably 4–10% by weight, and the concentration of the pitch may usually be 2–20% by weight, preferably 4–10% by weight. As the polymerization initiator, conventional polymerization initiators such as $\alpha,\alpha'$-azo-bis-isobutyronitrile, benzoyl peroxide and 2,2'-azo-bis-(2,4-dimethylvaleronitrile) may be employed. A preferred solvent is water. As in the conventional processes, as required, an organic solvent such as toluene, xylene, benzene or benzonitrile may be used as a diluent. Further, as required, a suspension stabilizer such as polyvinyl alcohol or methyl cellulose may also be added.

The organic monomer, pitch and the polymerization initiator, as well as the optionally added diluent and the suspension stabilizer are stirred in a solvent to form a uniform suspension. This may preferably be accomplished by stirring the mixture at high speed at a temerature of not higher than 20° C. Thereafter, the polymerization reaction may be carried out usually at 50° C. to 90° C. for 4–10 hours, preferably at 60°–80° C. for 5–8 hours.

By the above-described operation, the organic monomer is polymerized and crosslinked so that substantially spherical netty gel of organic polymer is formed, and the pitch is enclosed therein, thereby forming beads. The thus produced beads are then recovered. The recovery of the beads may be carried out by filtration.

The thus obtained beads are then infusibilized. The infusibilization may be accomplished by heating the beads in the air at a temperature of 250° C.–380° C. for several hours.

The thus infusibilized beads are then heated at a temperature of not lower than 1100° C., usually 1100° C. to 3000° C. under vacuum or under inert gas atmosphere. If the heating temperature is lower than 1100° C., the carbon content may not reach 97% by weight which is the minimum content defined in the present invention.

The carbon beads of the present invention may be used as a packing of liquid chromatography columns, especially as a packing of high performance liquid chromatography columns in the same manner as in the conventional packings.

The present invention will now be described by way of examples thereof. It should be noted that the examples are presented for the illustration purpose only and should not be interpreted in any restrictive way.

EXAMPLES 1-3

Production of Carbon Beads

A mixture of 5% by volume of a reduced pressure distillation residual oil with an average molecular weight of 600, 5% by volume of divinylbenzene, 1% by weight of polyvinyl alcohol, 0.25% by weight of azobisisobutyronitrile, 5% by weight of toluene and balance of deionized water was stirred at high speed using a laborutory disperser at a temperature of not higher than 20° C. The mixture was then heated at 80° C. for 6 hours under stirring. The generated beads were recovered by filtration and dried at 100° C. The beads were then heated at 350° C. for 3 hours in the air to infusibilize them. The beads were then heated under nitrogen gas atmosphere at 2500° C. (Example 1), 2700° C. (Example 2) or 1500° C. (Example 3). After heating, the beads were subjected to ultrasonication in benzene, washed with methanol/ether, dried at 100° C. and classified by sieving to obtain the carbon beads of the present invention.

The results of the elementary analysis, pore distribution and pore volume index of the obtained carbon beads are shown in Table 1. As is apparent from Table 1, the carbon beads satisfied all of the requirements defined in the present invention.

Comparative Example 1

The same procedure as in Examples 1–3 was repeated except that steam-cracked tar with an average molecular weight of 220 was used as the pitch, to obtain carbon beads.

The characteristics of the beads are shown in Table 1. As is apparent from Table 1, the obtained beads had a pore volume index (10–50)/(1–50) lower than that defined in the present invention.

Comparative Example 2

The same procedure as in Examples 1–3 was repeated except that the heating temperature was 1050° C. to obtain carbon beads.

The characteristics of the obtained carbon beads are shown in Table 1. As is apparent from Table 1, the carbon beads had a carbon content of lower than 97% which is the minimum limit defined in the present invention.

Comparative Example 3

The characteristics of mesophase pitch carbon wth a particle size of about 6 μm (heated at about 2800° C.), sold as a carbon material from Osaka Gas were examined. The results are shown in Table 1.

As is apparent from Table 1, the particles had a pore volume index (10–50)/(1–50) and a total pore volume lower than those defined in the present invention.

lenol was injected to the columns and the eluted fractions were analyzed based on the absorbance at 254 nm, to obtain chromatograms.

Figure 2:
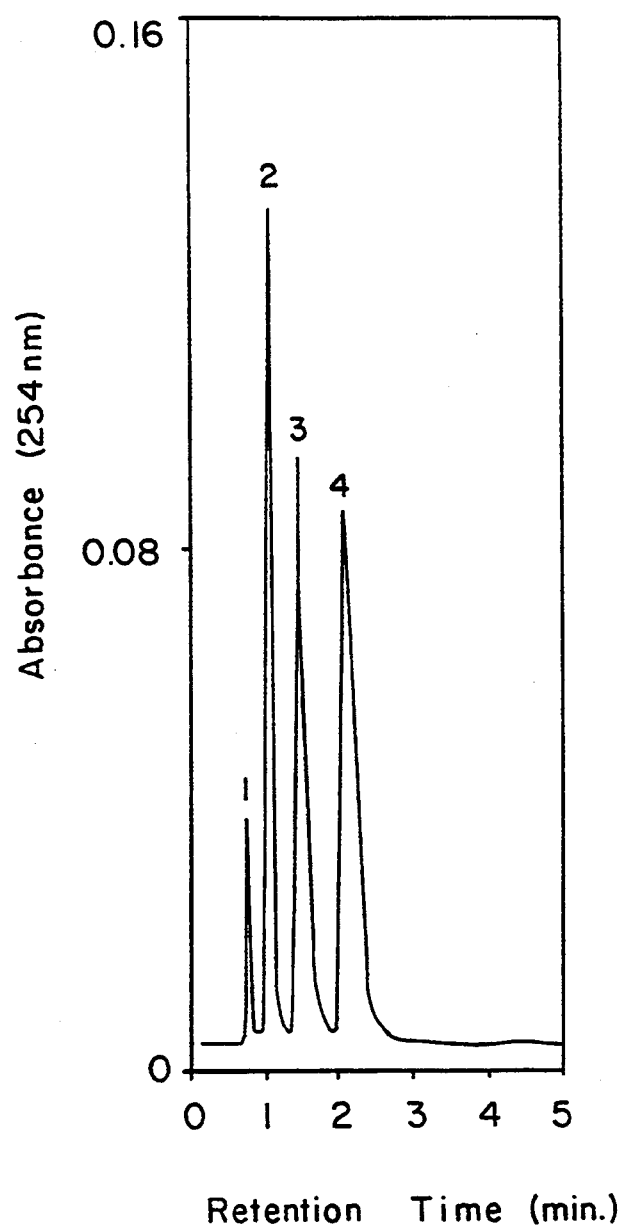
Figure 3:
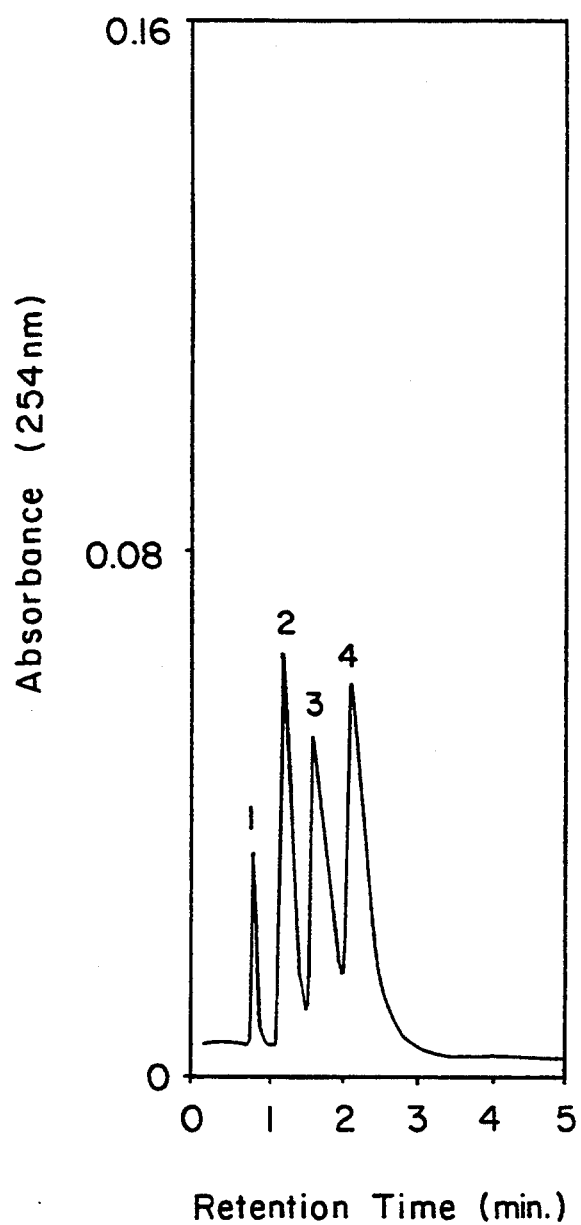
Figure 4:
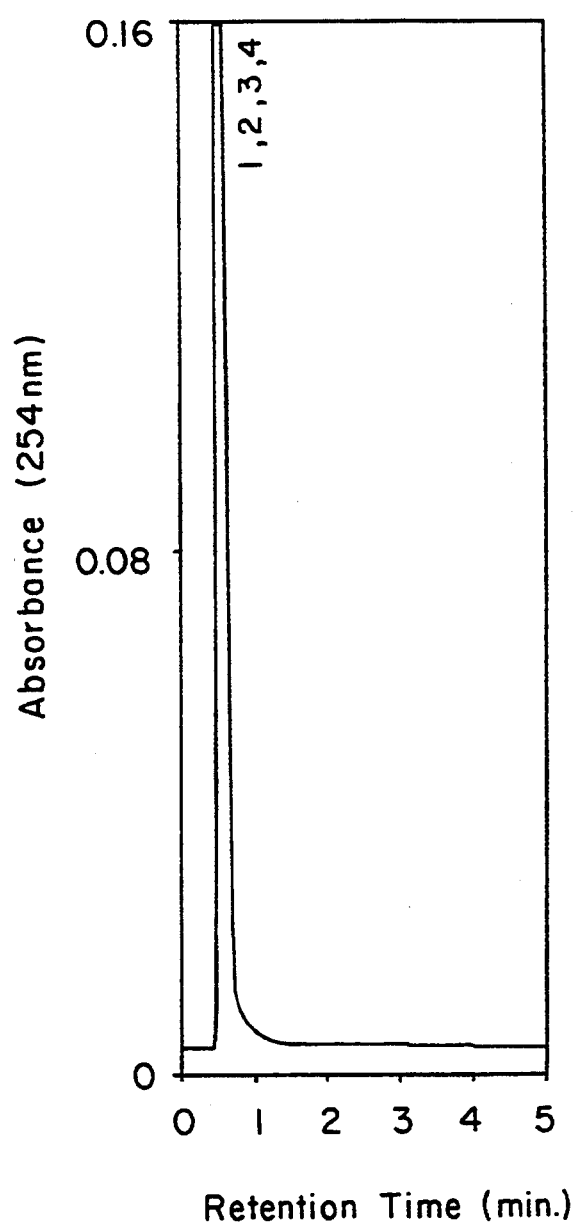
Figure 5:
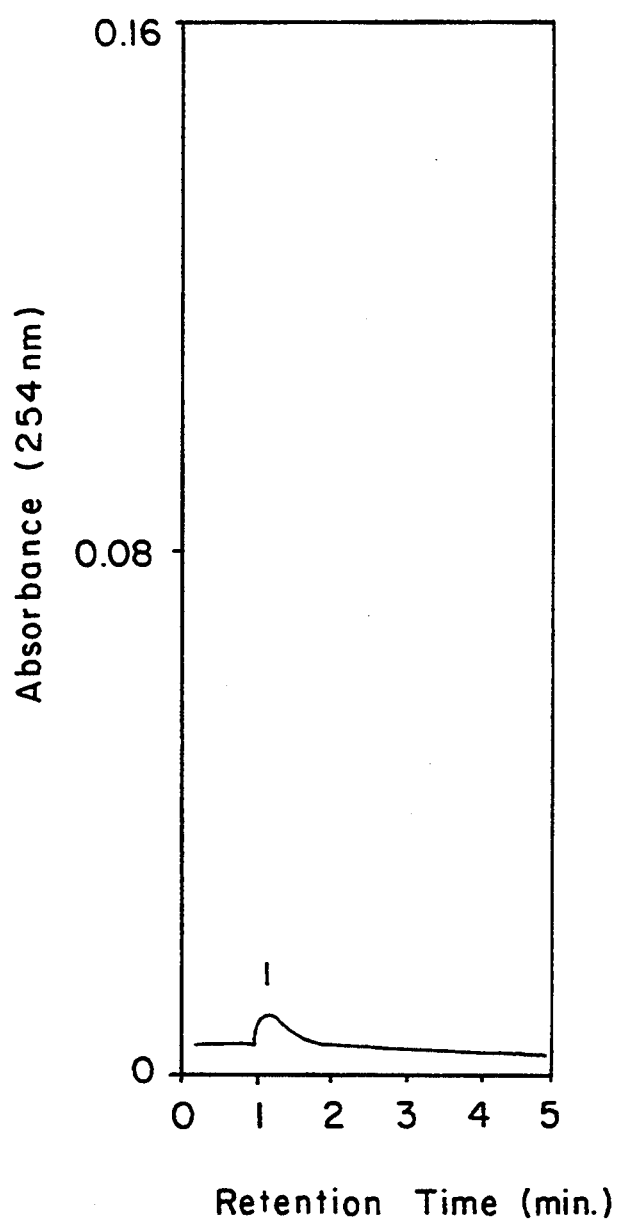
Figure 6:
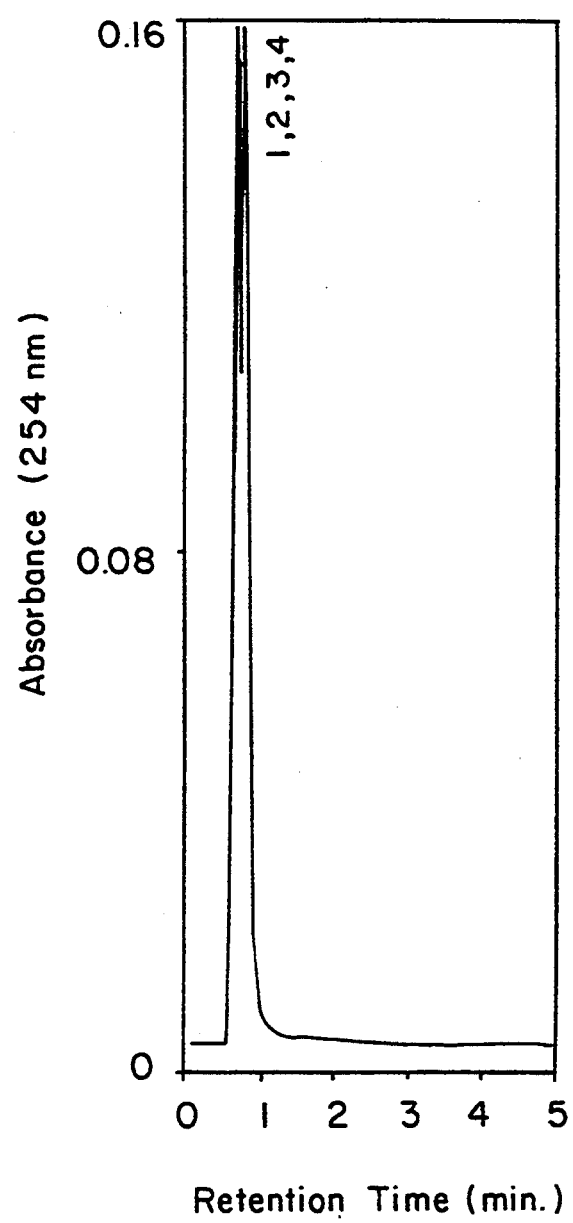

The chromatogram obtained by using the column containing the carbon beads prepared in Example 1 is shown in FIG. 1, the chromatogram obtained by using the column containing the carbon beads prepared in Example 2 is shown in FIG. 2, the chromatogram obtained by using the column containing the carbon beads prepared in Example 3 is shown in FIG. 3, the chromatogram obtained by using the column containing the carbon beads prepared in Comparative Example 1 is shown in FIG. 4, the chromatogram obtained by using the column containing the carbon beads prepared in Comparative Example 2 is shown in FIG. 5, and the chromatogram obtained by using the column containing the carbon beads prepared in Comparative Example 3 is shown in FIG. 6.

As is apparent from FIGS. 1–3, when the carbon beads prepared in Examples 1–3 are used, the four sample components are clearly separated. On the other hand, in the chromatogram shown in FIG. 4, the four sample components are not at all separated. In the chromatogram shown in FIG. 5, only one sample component was detected and the other components remained in the column. In the chromatogram shown in FIG. 6, the four sample components were separated into three, and the degree of separation was not so high as in the case of using the carbon beads of Examples 1–3.

We claim:

1. Carbon beads comprising 97% by weight of carbon and having a pore volume index (10–50)/(1–50) of at least 50%, a total pore volume of at least 0.15 ml/g, and a total volume of pores with radii of at least 50 nm of not more than 0.1 ml/g wherein said carbon beads are substantially spherical and have a uniform surface.

2. The carbon beads according to claim 1, wherein said pore volume index (10–50)/(1–50) is not less than 80%.

3. The carbon beads according to claim 1, wherein said beads have a particle size in the range of about 1–30 μm.

4. The carbon beads according to claim 1, wherein said total pore volume is at least 0.20 ml/g.

5. The carbon beads according to claim 1, wherein said total volume of pores having a radii of at least 50 nm is less than or equal to 0.05 ml/g.

TABLE 1

| | Elementary Analysis | | | | | Total Pore Volume | Pore Distribution: (Pore Radius (nm)) | | | Pore Volume Index (%) |
| | C | H | O | N | S | (ml/g) | 1~10 | 10~50 | 50~ | 10~50 / 1~50 |
| --- | --- | --- | --- | --- | --- | --- | --- | --- | --- | --- |
| Example 1 | 100 | 0 | 0 | 0 | 0 | 0.4442 | 0.0768 | 0.3569 | 0.0105 | 82.3 |
| Example 2 | 99.7 | 0 | 0 | 0 | 0 | 0.3798 | 0.0616 | 0.3015 | 0.0167 | 83.0 |
| Example 3 | 97.7 | 0 | 0.7 | 0.1 | 0.7 | 0.4341 | 0.0341 | 0.3929 | 0.0071 | 92.0 |
| Comparative Example 1 | 99.9 | 0 | 0 | 0 | 0 | 0.1347 | 0.0285 | 0.0181 | 0.0881 | 38.8 |
| Comparative Example 2 | 95.0 | 0.7 | 1.9 | 0.3 | 2.1 | 0.3641 | 0.0443 | 0.3137 | 0.0061 | 87.6 |
| Comparative Example 3 | 99.2 | 0.3 | 0 | 0 | 0.1 | 0.1462 | 0.0571 | 0.0134 | 0.0757 | 19.0 |

EXAMPLE 4

The carbon beads obtained in Examples 1–3 and Comparative Examples 1–3 were packed in stainless steel columns with an inner diameter of 4 mm and a length of 10 cm by the equilibrium slurry method to prepare packed columns for liquid chromatography. The columns were connected to a high performance liquid chromatography apparatus and 95% methanol was passed at a flow rate of 1 ml/min as a mobile phase. A standard mixture of acetone, phenol, cresol and xy- 6. The carbon beads according to claim 1, wherein said carbon content is at least 99% by weight.

7. Carbon beads comprising 97% by weight of carbon and having a pore volume index (10–50)/(1–50) of at least 50%, a total pore volume of at least 0.15 ml/g, and a total volume of pores with radii of at least 50 nm of not more than 0.1 ml/g, wherein said carbon beads are formed from at least one pitch having an average molecular weight of at least 300 and wherein said carbon beads are substantially spherical and have a uniform surface.

8. A packing material consisting essentially of carbon beads having a pore volume index (10–50)/(1–50) of at least 50%, a total pore volume of at least 0.15 ml/g, and a total volume of pores with radii of at least 50 nm of not more than 0.1 ml/g, wherein said carbon beads have a carbon content of at least 97% by weight and wherein said carbon beads are substantially spherical and have a uniform surface.

9. A carbon bead population, comprising carbon beads having pores, wherein said population has a total more volume of at least 0.15 ml/g, the total volume of pores with radii of at least 50 nm being not more than 0.1 ml/g, and the ratio of the total volume of pores with a radius of 10–50 nm to the total volume of pores with a radius of 1–50 nm being at least 0.5 wherein the carbon content of said carbon beads is at least 97% by weight carbon, said carbon beads being substantially spherical and having a uniform surface.

* * * * *